US008180554B2

(12) United States Patent
Forte et al.

(10) Patent No.: US 8,180,554 B2
(45) Date of Patent: May 15, 2012

(54) METHOD AND DEVICES TO REDUCE THE DIFFERENCE BETWEEN NORMALIZED AIR-FUEL RATIO OF THE VARIOUS CYLINDERS IN AN INTERNAL COMBUSTION ENGINE AND A PREDETERMINED VALUE

(75) Inventors: Pasquale Forte, Orsenigo (IT); Stefano Bordegnoni, Orsenigo (IT); Andrea Gelmetti, Orsenigo (IT)

(73) Assignee: Eldor Corporation S.p.A., Orsenigo (IT)

( * ) Notice: Subject to any disclaimer, the term of this patent is extended or adjusted under 35 U.S.C. 154(b) by 401 days.

(21) Appl. No.: 12/447,852

(22) PCT Filed: Oct. 17, 2007

(86) PCT No.: PCT/EP2007/008983

§ 371 (c)(1),
(2), (4) Date: Nov. 3, 2009

(87) PCT Pub. No.: WO2008/052651

PCT Pub. Date: May 8, 2008

(65) Prior Publication Data

US 2010/0070157 A1 Mar. 18, 2010

(30) Foreign Application Priority Data

Oct. 31, 2006 (IT) .............................. MI2006A2097

(51) Int. Cl.

| | |
|---|---|
| ***G06F 19/00*** | (2011.01) |
| ***F02D 41/14*** | (2006.01) |
| ***F02D 41/30*** | (2006.01) |
| ***F02M 51/00*** | (2006.01) |

(52) U.S. Cl. ........ 701/104; 701/109; 701/111; 123/435; 123/673; 123/694

(58) Field of Classification Search .......... 701/101–105, 701/109, 111, 114, 115; 123/435, 488, 673, 123/674, 688, 694, 696, 700, 704, 406.26–406.28; 73/114.08, 114.71–114.73; 702/182, 183, 702/185, 189, 190, 196, 197, FOR. 164
See application file for complete search history.

(56) References Cited

U.S. PATENT DOCUMENTS

| | | | | |
|---|---|---|---|---|
| 4,185,604 | A * | 1/1980 | Nagaishi et al. | 123/536 |
| 5,038,562 | A * | 8/1991 | Goerlich | 60/274 |
| 5,732,689 | A | 3/1998 | Ohno et al. | |
| 5,755,206 | A * | 5/1998 | Takahashi et al. | 123/406.37 |
| 5,811,670 | A * | 9/1998 | Nolte et al. | 73/114.72 |
| 6,029,627 | A * | 2/2000 | VanDyne | 123/435 |
| 6,382,198 | B1 * | 5/2002 | Smith et al. | 123/673 |
| 6,708,681 | B2 * | 3/2004 | Hosoya et al. | 123/681 |
| 7,925,420 | B2 * | 4/2011 | Forte et al. | 701/104 |
| 2004/0084025 | A1 | 5/2004 | Zhu et al. | |
| 2009/0326786 | A1 * | 12/2009 | Forte et al. | 701/103 |

* cited by examiner

*Primary Examiner* — Willis Wolfe, Jr.
*Assistant Examiner* — Johnny Hoang
(74) *Attorney, Agent, or Firm* — Greer, Burns & Crain, Ltd.

(57) ABSTRACT

The invention relates to the field of methods and devices for reducing the difference between normalized air-fuel ratio of the various cylinders compared with a predetermined value between 0.7 and 1.1, of the normalized air-fuel ratio in an internal combustion engine. The method and devices utilize the signal of the ionization current produced by a suitable device, modifying the quantity of fuel on the basis of the signal determined by means of the method in question in the invention.

6 Claims, 4 Drawing Sheets

METHOD AND DEVICES TO REDUCE THE DIFFERENCE BETWEEN NORMALIZED AIR-FUEL RATIO OF THE VARIOUS CYLINDERS IN AN INTERNAL COMBUSTION ENGINE AND A PREDETERMINED VALUE

This application is a U.S. National Phase under 35 U.S.C. §371 of International Application No. PCT/EP2007/008983, filed Oct. 17, 2007.

TECHNICAL FIELD

The present invention relates to a method and devices therefor for reducing the difference of the normalized air-fuel ratio of the various cylinders in an internal combustion engine compared with a predetermined value between 0.7 and 1.1.

BACKGROUND ART

As it is known, to optimize the combustion process in an internal combustion engine with several cylinders, it is necessary for the air-fuel ratio in each cylinder to be in proximity to the stoichiometric value. The devices and methods currently utilized and available in the market are based on oxygen sensors, usually housed in the exhaust conduit in proximity to the catalytic converter.

However, these sensors present certain drawbacks, for example, they are subject to breakage. Furthermore, it is not normally possible to determine the air-fuel ratio of the single cylinders as the sensor signal refers to the exhaust gases from the single cylinders when already mixed in the exhaust manifold. The complicated signal treatments which would serve to reconstruct the air-fuel ratio of the single cylinders do not guarantee the precision necessary for the controller device which is supposed to realign the cylinders.

DISCLOSURE OF INVENTION

The aim of the present invention is to identify a method and devices therefor for reducing the difference of the normalized air-fuel ratio in the various cylinders of an internal combustion engine compared with a predetermined value, preferably between 0.7 and 1.1, eliminating the oxygen sensors to overcome the drawbacks described.

The present invention is based on the use of the ionization current released by a device positioned on top of each cylinder of the said engine. In particular, the signal of the said ionization current is acquired by a Control Unit, commonly utilised for the management of the said engines. The said Control Unit is equipped with means, preferably electronic ones, which actuate the method of the present invention. The said method, repeated continually for each cycle of the said engine, develops over various phases.

The aims and advantages of the present invention will better emerge in the description that follows and the embodiments of the invention, illustrated in the plates enclosed purely in the form of simplified, non-limiting examples of an internal combustion engine with four cylinders:

Figure 1:
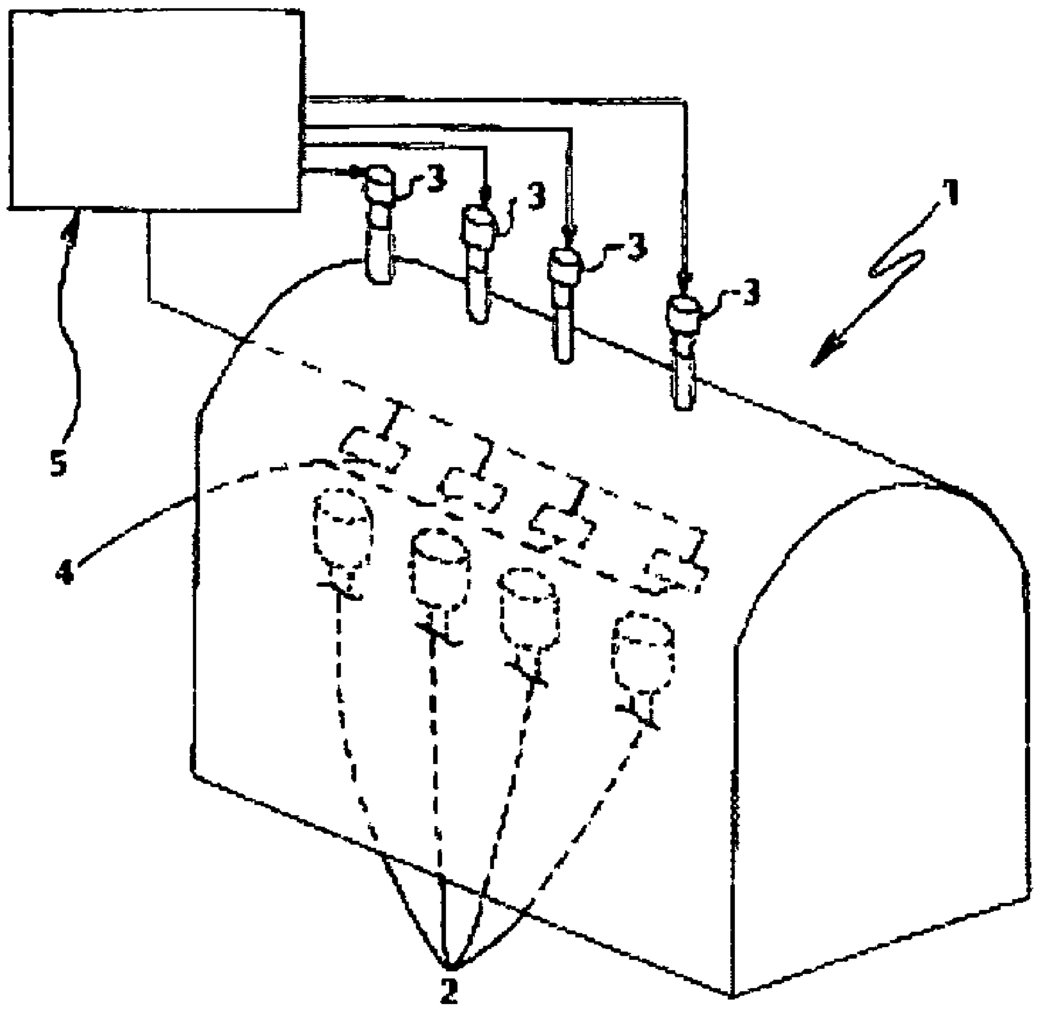
FIG. 1 illustrates a schematic view of the engine which employs the method and the control unit in which the means (not shown graphically) that actuate the invention in question are housed.

With reference to FIG. 1, (1) indicates an internal combustion engine as a whole, fitted with a device (4) located on top of each cylinder, which, in addition to creating the spark—by means of the spark plug—necessary to realise the combustion inside the cylinder, releases the ionization current indispensable for actuating the method of the invention in question, and injectors (3) which provide for the direct injection of fuel into the cylinders (2). This figure likewise shows a control unit (5). The said control unit (5) contains: known electronic means (not shown graphically) which are suitable to generate a signal representing the normalized air-fuel ratio in each cylinder (2) of the said engine (1) on the basis of the ionization current signal; electronic means suitable to verify the constant number of revolutions of the said engine (1) on the basis of the ionization current signal; electronic means suitable to verify the constant torque of the said engine (1) on the basis of the ionization current signal; electronic means suitable to verify the constant normalized air-fuel ratio in each cylinder of the said engine (1) on the basis of the ionization current signal; electronic means suitable to generate an electronic signal representing the quantity of air present in each cylinder, and electronic devices to actuate the method in question in the present invention.

Figure 2:
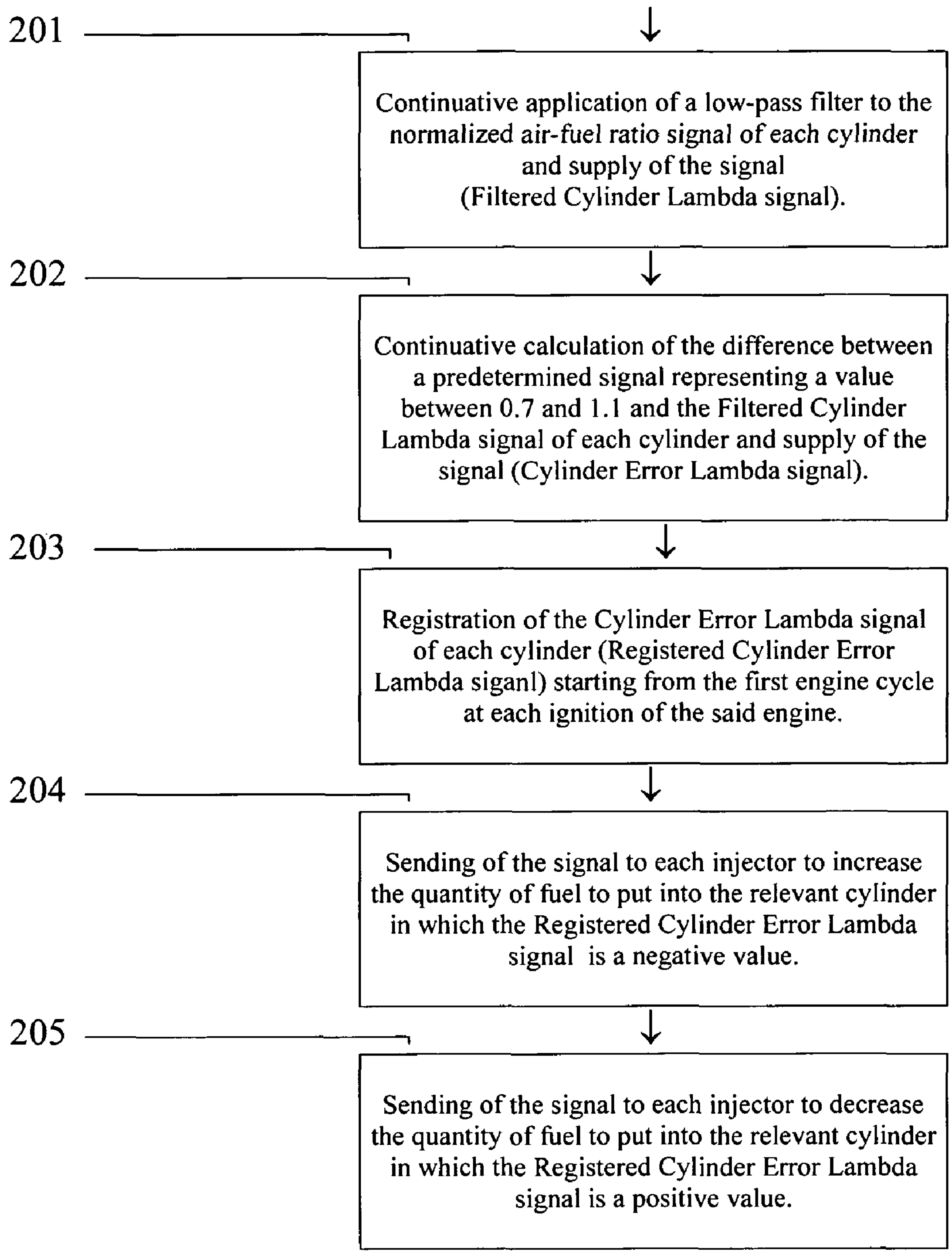
FIG. 2 illustrates, schematically, the flow chart relating to the method according to the invention in question.

With reference to FIG. 2, the said figure indicates a flow chart which schematically illustrates the method in question in the invention. This method develops over various phases.

The first phase (201) relates to the continuative application of a low-pass filter to the normalized air-fuel ratio signal of each cylinder (2) of the engine (1). The signal obtained following application of the low-pass filter is named in the present invention as the Filtered Cylinder Lambda signal.

The subsequent phase (202) relates to the continuative calculation of the difference between a predetermined signal representing a value between 0.7 and 1.1 and the Filtered Cylinder Lambda signal of each cylinder (2), and the obtaining of the signal relating to the operation realised during the said phase. The signal generated in phase 202 is named in the present invention as the Cylinder Error Lambda signal.

In the subsequent phase of the method (203), the Cylinder Error Lambda signal of each cylinder (2) is registered starting from the first engine cycle at each ignition of the said engine (1). Each signal registered in the said phase 203 is named in the present invention as the Registered Cylinder Error Lambda signal.

The method continues with the subsequent phase (204) in which the injectors (3) receive the increase signal for the quantity of fuel to put into the relevant cylinder (2) which has the Registered Cylinder Error Lambda signal with a negative value.

The method likewise envisages a further phase (205) in which the injectors (3) receive the decrease signal for the quantity of fuel to put into the relevant cylinder (2) which has the Registered Cylinder Error Lambda signal with a positive value.

Figure 3:
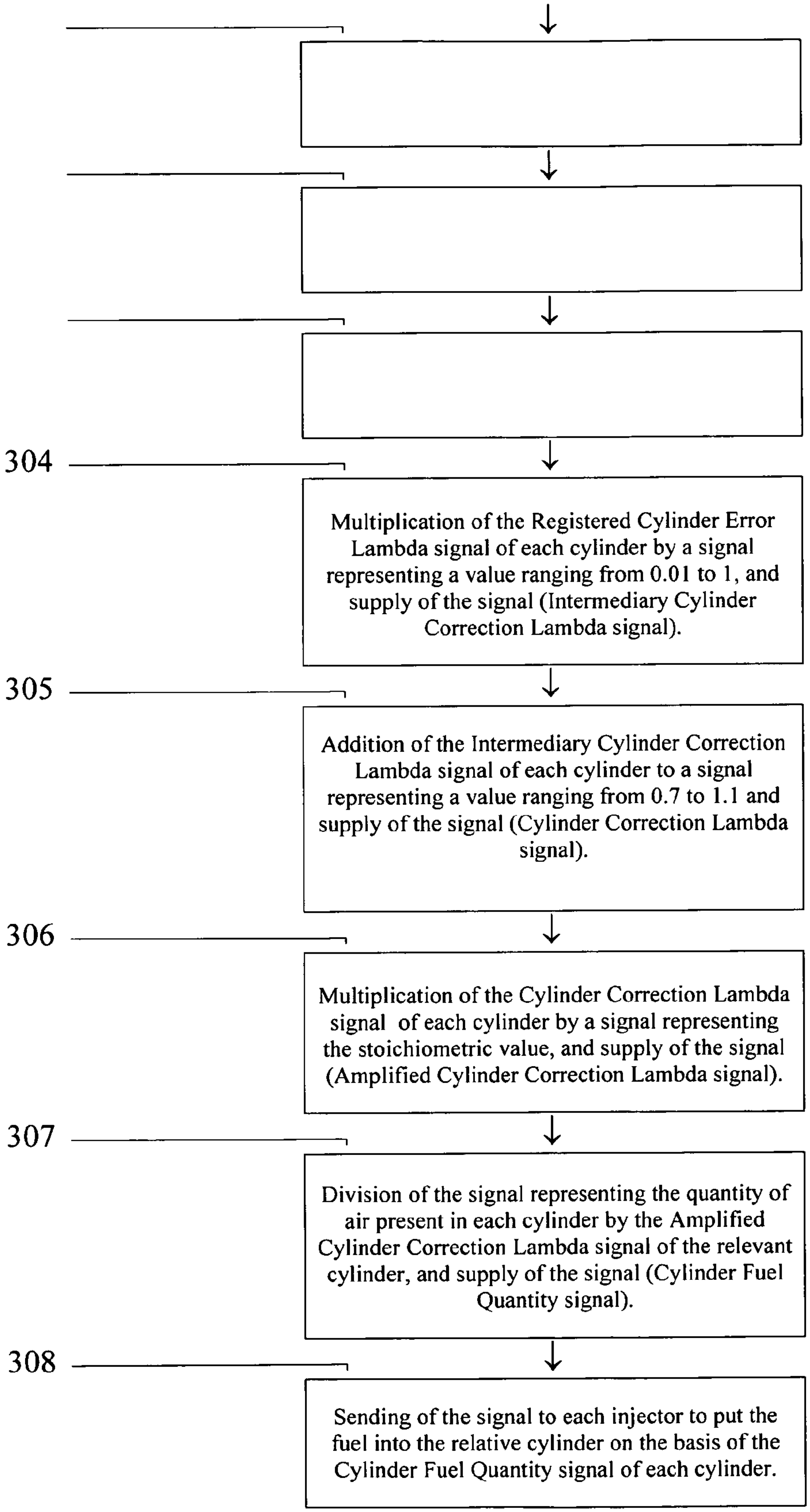
FIGS. 3 and 4 illustrate further flow charts of embodiments of the method according to the invention in question.

FIG. 3 indicates a second embodiment of the invention in which phases 204 and 205 of the method described above are replaced by the following 5 phases.

Figure 4:
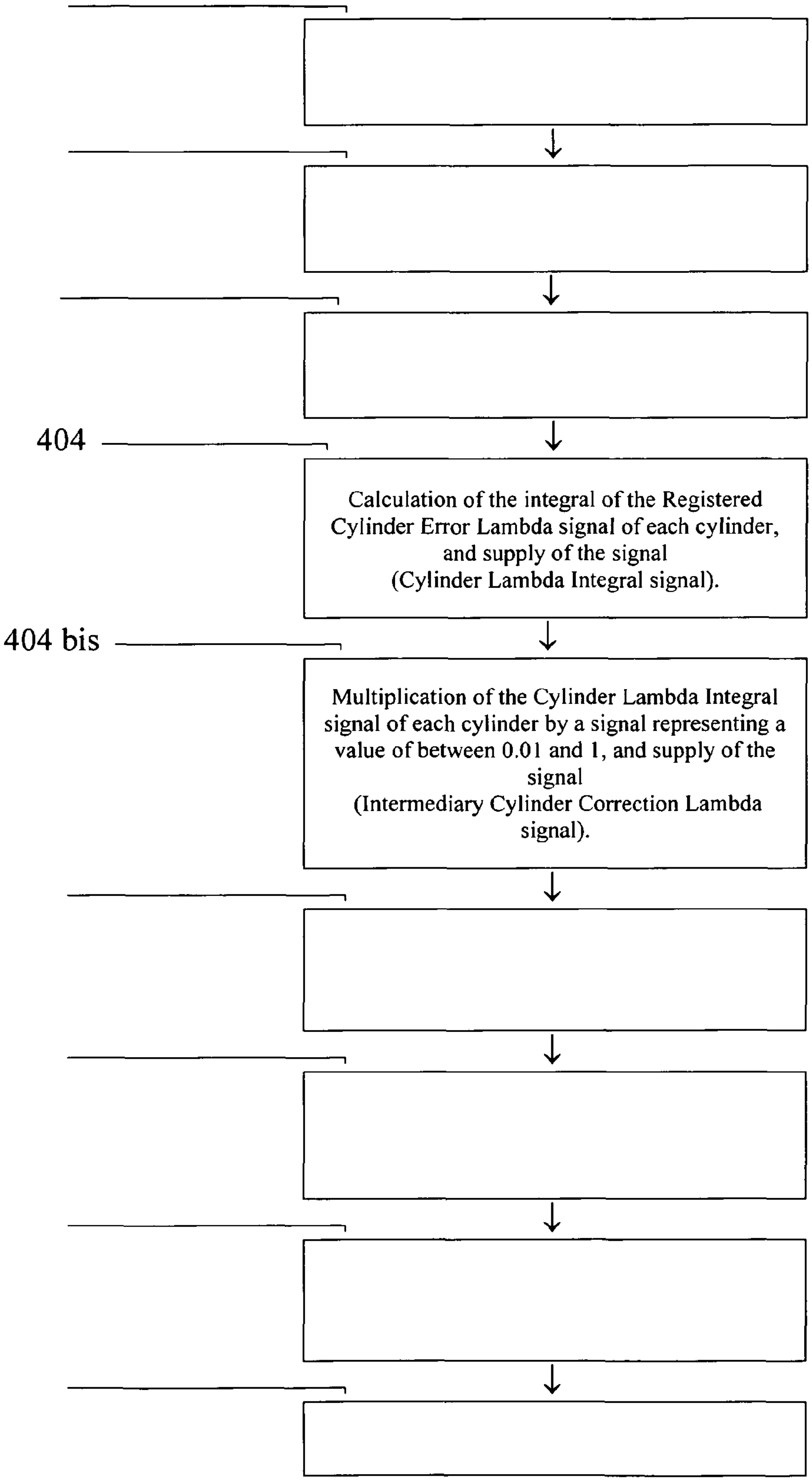

In the first phase (304), the Registered Cylinder Error Lambda signal of each cylinder (2) is multiplied by a signal representing a value between 0.01 and 1. Phase 304 likewise envisages the obtaining of the signal determined by the operation realized during the said phase, named as the Intermediary Cylinder Correction Lambda signal. In the second phase (305), the Intermediary Cylinder Correction Lambda signal of each cylinder (2) is added to a signal representing a predetermined value between 0.7 and 1.1. Phase 305 likewise envisages the obtaining of the signal determined by the operation realized during the said phase 305, named in the present invention as the Cylinder Correction Lambda signal. In the third phase (306), the Cylinder Correction Lambda signal of each cylinder (2) is multiplied by a signal representing the stoichiometric value. Phase 306 likewise envisages the obtaining of the signal determined by the operation realised during the said phase, named in the present invention as the Amplified Cylinder Correction Lambda. In the fourth phase (307), the signal representing the quantity of air present in each cylinder (2) is divided by the Amplified Cylinder Correction Lambda signal of the relative cylinder. Phase 307 likewise also envisages the obtaining of the signal determined by the operation realised during the said phase, known in the present invention as the Cylinder Fuel Quantity. The fifth phase (308) envisages the sending of the signal to each injector (3) to admit the fuel into the relative cylinder (2) on the basis of the Cylinder Fuel Quantity signal of each cylinder acquired during the previous phase (307) and which is used to correct, in an inversely proportional manner, the predetermined quantity of petrol to inject into the relative cylinder; i.e. increasing the value of the signal decreases the quantity of petrol injected and vice versa. FIG. 4 illustrates a third embodiment of the present invention in which phase 304 of the method described above is replaced by two further phases. The first of the said phases is phase 404, which relates to the calculation of the integral, known to a technician in the field, of the Registered Cylinder Error Lambda signal of each cylinder (2) of the said engine (1). Phase 404 likewise envisages the obtaining of the signal determined by the operation realised during the said phase, named in the present invention as the Cylinder Lambda Integral signal. In the second phase of the said two phases (404 bis), the Cylinder Lambda Integral signal of each cylinder (2) is multiplied by a signal representing a value of between 0.01 to 1. Phase 404 bis likewise envisages the obtaining of the signal determined by the operation realised during the said phase 404 bis; the said signal is known in the present invention as the Intermediary Cylinder Correction Lambda signal and is used to correct, in an inversely proportional manner, the predetermined quantity of petrol to inject into the relevant cylinder.

The invention claimed is:

1. A method for reducing a difference of normalized air-fuel ratios of various cylinders compared with an objective value of the normalized air-fuel ratio in an internal combustion engine having a plurality of cylinders, injectors, a device to generate ionization current and the signal thereof for each cylinder, a control unit for said engine comprising electronic means suitable to generate a signal representing the normalized air-fuel ratio in each cylinder of said engine on the basis of the ionization current signal, electronic means suitable to verify the constant number of revolutions of said engine on the basis of the ionization current signal, electronic means suitable to verify constant torque delivered by said engine on the basis of the ionization current signal, electronic means suitable to verify the constant normalized air-fuel ratio in each cylinder of said engine on the basis of the ionization current signal, and electronic means suitable to generate an electronic signal representing the quantity of air present in each cylinder, said method comprising:

continuative application of a low-pass filter to the normalized air-fuel ratio signal of each cylinder of said engine to obtain a Filtered Cylinder Lambda signal for each cylinder;

continuative calculation of a difference between a predetermined signal representing a value between 0.7 and 1.1 and the Filtered Cylinder Lambda signal of each cylinder to obtain a Cylinder Error Lambda signal for each cylinder;

registering the Cylinder Error Lambda signal of each cylinder as a Registered Cylinder Error Lambda signal starting from the first engine cycle at each ignition of said engine;

sending a signal to each injector to increase the quantity of fuel put into the relevant cylinder in which the Registered Cylinder Error Lambda signal is a negative value; and sending a signal to each injector to decrease the quantity of fuel to admit to the relevant cylinder in which the Registered Cylinder Error Lambda signal is a positive value.

2. A device for reducing the difference between the normalized air-fuel ratios of the various cylinders compared with a predetermined value between 0.7 and 1.1 of the normalized air-fuel ratio in an internal combustion engine which actuates the method of claim 1.

3. A method for reducing a difference of normalized air-fuel ratios of various cylinders compared with an objective value of the normalized air-fuel ratio in an internal combustion engine having a plurality of cylinders, injectors, a device to generate ionization current and the signal thereof for each cylinder, a control unit for said engine comprising electronic means suitable to generate a signal representing the normalized air-fuel ratio in each cylinder of said engine on the basis of the ionization current signal, electronic means suitable to verify the constant number of revolutions of said engine on the basis of the ionization current signal, electronic means suitable to verify constant torque delivered by said engine on the basis of the ionization current signal, electronic means suitable to verify the constant normalized air-fuel ratio in each cylinder of said engine on the basis of the ionization current signal, and electronic means suitable to generate an electronic signal representing the quantity of air present in each cylinder, said method comprising:

continuative application of a low-pass filter to the normalized air-fuel ratio signal of each cylinder of said engine to obtain a Filtered Cylinder Lambda signal for each cylinder;

continuative calculation of a difference between a predetermined signal representing a value between 0.7 and 1.1 and the Filtered Cylinder Lambda signal of each cylinder to obtain a Cylinder Error Lambda signal for each cylinder;

registering the Cylinder Error Lambda signal of each cylinder as a Registered Cylinder Error Lambda signal starting from the first engine cycle at each ignition of said engine;

multiplying the Registered Cylinder Error Lambda signal of each cylinder by a signal representing a value between 0.01 to 1 to obtain an Intermediary Cylinder Correction Lambda signal for each cylinder;

adding the Intermediary Cylinder Correction Lambda signal of each cylinder to a signal representing a predetermined value between 0.7 and 1.1 to obtain a Cylinder Correction Lambda for each cylinder;

multiplying the Cylinder Correction Lambda signal of each cylinder by a signal representing the stoichiometric value to obtain an Amplified Cylinder Correction Lambda signal for each cylinder;

dividing the signal representing the quantity of air present in each cylinder by the Amplified Cylinder Correction Lambda signal of the respective cylinder to obtain a Cylinder Fuel Quantity signal for each cylinder; and sending a signal to each injector to admit the fuel into the relevant cylinder on the basis of the Cylinder Fuel Quantity signal of each cylinder.

4. A device for reducing the difference between the normalized air-fuel ratios of the various cylinders compared with a predetermined value between 0.7 and 1.1 of the normalized air-fuel ratio in an internal combustion engine which actuates the method of claim 3.

5. A method for reducing a difference of normalized air-fuel ratios of various cylinders compared with an objective value of the normalized air-fuel ratio in an internal combustion engine having a plurality of cylinders, injectors, a device to generate ionization current and the signal thereof for each cylinder, a control unit for said engine comprising electronic means suitable to generate a signal representing the normalized air-fuel ratio in each cylinder of said engine on the basis of the ionization current signal, electronic means suitable to verify the constant number of revolutions of said engine on the basis of the ionization current signal, electronic means suitable to verify constant torque delivered by said engine on the basis of the ionization current signal, electronic means suitable to verify the constant normalized air-fuel ratio in each cylinder of said engine on the basis of the ionization current signal, and electronic means suitable to generate an electronic signal representing the quantity of air present in each cylinder, said method comprising:

continuative application of a low-pass filter to the normalized air-fuel ratio signal of each cylinder of said engine to obtain a Filtered Cylinder Lambda signal for each cylinder;

continuative calculation of a difference between a predetermined signal representing a value between 0.7 and 1.1 and the Filtered Cylinder Lambda signal of each cylinder to obtain a Cylinder Error Lambda signal for each cylinder;

registering the Cylinder Error Lambda signal of each cylinder as a Registered Cylinder Error Lambda signal starting from the first engine cycle at each ignition of said engine;

calculating the integral of the Registered Cylinder Error Lambda signal for each cylinder to obtain a Cylinder Lambda Integral signal for each cylinder;

multiplying the Cylinder Lambda Integral signal for each cylinder by a signal representing a value of between 0.01 to 1 to obtain an Intermediary Cylinder Correction Lambda signal for each cylinder;

adding the Intermediary Cylinder Correction Lambda signal of each cylinder to a signal representing a predetermined value between 0.7 and 1.1 to obtain a Cylinder Correction Lambda for each cylinder;

multiplying the Cylinder Correction Lambda signal of each cylinder by a signal representing the stoichiometric value to obtain an Amplified Cylinder Correction Lambda signal for each cylinder;

dividing the signal representing the quantity of air present in each cylinder by the Amplified Cylinder Correction Lambda signal of the respective cylinder to obtain a Cylinder Fuel Quantity signal for each cylinder; and sending a signal to each injector to admit the fuel into the relevant cylinder on the basis of the Cylinder Fuel Quantity signal of each cylinder.

6. A device for reducing the difference between the normalized air-fuel ratios of the various cylinders compared with a predetermined value between 0.7 and 1.1 of the normalized air-fuel ratio in an internal combustion engine which actuates the method of claim 5.

* * * * *